United States Patent [19]
Luotonen

[11] Patent Number: 5,864,852
[45] Date of Patent: Jan. 26, 1999

[54] PROXY SERVER CACHING MECHANISM THAT PROVIDES A FILE DIRECTORY STRUCTURE AND A MAPPING MECHANISM WITHIN THE FILE DIRECTORY STRUCTURE

[75] Inventor: Ari Luotonen, San Francisco, Calif.

[73] Assignee: Netscape Communications Corporation, Mountain View, Calif.

[21] Appl. No.: 638,637

[22] Filed: Apr. 26, 1996

[51] Int. Cl.⁶ ................................................ G06F 17/30
[52] U.S. Cl. .............................. 707/10; 707/104; 707/9; 395/187.01; 395/200.76
[58] Field of Search ....................... 395/601, 650, 395/671, 200.09, 610, 793, 403, 425, 187.01, 200.2, 200.76; 370/396; 364/200; 707/10, 104, 9

[56] References Cited

U.S. PATENT DOCUMENTS

| | | | |
|---|---|---|---|
| 4,464,713 | 8/1984 | Benhase et al. | 364/200 |
| 5,276,829 | 1/1994 | Sano | 395/425 |
| 5,452,447 | 9/1995 | Nelson et al. | 395/650 |
| 5,530,852 | 6/1996 | Meske, Jr. et al. | 395/610 |
| 5,566,302 | 10/1996 | Khalidi et al. | 395/200.09 |
| 5,572,643 | 11/1996 | Judson | 395/793 |
| 5,577,251 | 11/1996 | Hamilton et al. | 395/671 |
| 5,581,522 | 12/1996 | Civanlar et al. | 370/396 |
| 5,584,003 | 12/1996 | Yamaguchi et al. | 395/403 |
| 5,586,260 | 12/1996 | Hu | 395/200.2 |
| 5,623,600 | 4/1997 | Ji et al. | 395/187.01 |
| 5,623,652 | 4/1997 | Vora et al. | 395/610 |
| 5,678,041 | 10/1997 | Baker et al. | 707/9 |
| 5,696,898 | 12/1997 | Baker et al. | 395/187.01 |
| 5,727,159 | 3/1998 | Kinkinis | 395/200.76 |

OTHER PUBLICATIONS

Oppliger, Internet Security Enters the Middle Age, IEEE, pp. 100–101, Oct. 1995.

Deri, Surfin' Network Resources Across the Web, IEEE, pp. 158–167, Jun. 1996.

Kwan, NCSA's World Wide Web Server: Design and Performance, IEEE, pp. 68–74, Nov. 1995.

Jeffrey, Proxy–Sharing Proxy–Servers, IEEE, pp. 116–119, May 1996.

Princeton, The Princeton University HTTP and WAIS, Lycos, pp. 1–2.

Chankhunthod et al., A Hierarchical Internet Object Cache, pp. 1–13, 1996.

Luotonen et al, World Wide Web Proxies, pp. 1–8, Apr. 1994.

Chankhunthod et al., "A Hierarchical Internet Object Cache", no date.

Primary Examiner—Thomas G. Black
Assistant Examiner—Frantz Coby
Attorney, Agent, or Firm—Michael A. Glenn

[57] ABSTRACT

In a proxy server, variable length URLs are digested and thereby homogenized, such that each URL is converted to a URL fingerprint that has a unique identity and a same fixed size. The URL fingerprint is used to map the URL to a proxy server cache directory structure. A unique file name may also be generated from the URL fingerprint for each URL. The same bits are used in the file name, such that any given file can be remapped later to a directory structure that had been expanded or collapsed, so that the first bits are not unique to a particular hierarchy. A unique cache information file is included in the directory to store document-related information for each other file in the directory for quick access. Accordingly, the invention provides an addressing and cache organization scheme that allows quick access to documents that contain all the relevant information for each of the URLs.

24 Claims, 4 Drawing Sheets

PROXY SERVER CACHING MECHANISM THAT PROVIDES A FILE DIRECTORY STRUCTURE AND A MAPPING MECHANISM WITHIN THE FILE DIRECTORY STRUCTURE

BACKGROUND OF THE INVENTION

1. Technical Field

The invention relates to the exchange of information over an electronic network. More particularly, the invention relates to a proxy server caching mechanism that provides a file directory structure and a mapping mechanism within the file directory structure in an electronic network.

2. Description of the Prior Art

Modern information networks, e.g. the Internet, use servers to store documents. In the World Wide Web (Web), these documents are addressed by uniform resource locators (URLs). URLs specify the protocol by a prefix in the URL, such as http:// for HyperText Transfer Protocol, the host in the Internet where the document is stored, and the address of the document within that host. The Web is thus not a single protocol, but a combination of several protocols united by a common addressing scheme, i.e. the URL.

The tremendous continuing growth of the Web makes it necessary to have intermediate servers which perform caching (store documents locally, such that the documents may be quickly accessed from the local file system, instead of being retransferred again from the original server. Such servers (see, for example A. Luotonen, K. Altis, *World wide Web Proxies*, Proceedings of First International World-Wide Web Conference, Geneva 1994) are referred to as caching proxy servers, or proxies for short. See, also A. Chakhuntod, P. Danzig, C. Neerdaels, M. Schwartz, K. Worrell, *A Hierarchical Internet Object Cache*, USENIX 1996 ANNUAL TECHNICAL CONFERENCE, http://usenix.org/publications/library/proceedings/sd96/danzig.html). Proxies reduce network load, and shorten response times to the user.

FIG. 1 is a block schematic diagram of a proxy server 14. When a client 12 requests a new document from the proxy server 14, the proxy server copies the document from the origin server 16 to its local file system in addition to sending the document to the client 12. When another request comes for the same document, the proxy server returns the document from the cache 15 if the cached copy is still up to date. If the proxy server determines that the document may be out of date, it performs an up-to-date check from the remote origin server and refreshes the document, if necessary, before sending it to the client 12.

Within a proxy server, an internal addressing mechanism is necessary to map the URLs to their location in the cache of the proxy server. Historically, the first caching proxy server, the "CERN httpd," mapped the URL directly to a UNIX file system path such that, for example:

http://home.netscape.com/some/file.html would become:

/cache-root/http/home.netscape.com/some/file.html.

This, however, was inefficient in several ways, including:

The path names for cached files could get extensively long and thus the file itself was time-consuming to located in the file system;

The directory holding the subdirectories corresponding to the second part of the URL (the host names) could get extensively large (i.e. thousands of entries). This is not very efficient in most commonly used operating systems, such as UNIX, because such operating systems must perform a time-consuming sequential searching through the directory to actually locate the desired file; and The maintenance of such a cache becomes extensively hard because the contents of the cache are location-dependent, and the material at a given location in the cache is not "average." Thus, deciding which files should be kept in the cache and which removed therefrom is difficult.

Another caching proxy server, the Harvest Cache Daemon (see A. Chakhuntod, P. Danzig, C. Neerdaels, M. Schwartz, K. Worrell, *A Hierarchical Internet Object Cache, ibid.*), does not use the URL as part of the mapping scheme, but simply assigns a random file name to each URL, and maintains a central file containing the mappings from URLs to file names. This approach also has limitations, such as for example:

It is slow to start up the proxy server because it has to load the map file into the memory. Such process typically takes several minutes, thus exacerbating system latency;

It is wasteful of the RAM (main memory of the computer) because such central map file can get very big; and It is fragile because the entire cache becomes unusable if the map file is lost or damaged.

The ability to locate documents in the cache without latency induced by long path names and large directories is very important. There is also another important aspect of the cache design, that is to make it easy to clean up old cache documents that are no longer necessary (i.e. garbage collection).

As described above, the "CERN httpd" proxy server cache has the undesired quality of being very location specific, i.e. each directory could contain entirely different types of documents, and no given directory could be considered "average." For example, some directories might contain only GIF images, whereas others would contain only HTML files (HyperText Markup Language), or Postscript files. Thus, when the "garbage collector" is traversing the cache structure, it is impossible to know beforehand how much data and how many documents are in the cache because the structure of the cache is not known until the cache is entirely traversed. Therefore, it is hard to make effective decisions about which documents should be kept and which should be removed.

It would be advantageous to provide a proxy server cache structure that stores and accesses documents in an optimum manner in a storage hierarchy that is easily managed.

SUMMARY OF THE INVENTION

The invention provides a mechanism that makes it possible to locate any cache document anywhere in the cache by using an input URL to mathematically produce both a unique (in practice) file name and a directory to which the file belongs. An algorithm, such as the MD5® (Message Digest-5) protocol is used in the process of generating the file name and the directory location. A fixed size directory structure is provided, thus eliminating deep path names. Hashing throughout the cache directories is provided to avoid extensively large directories, while providing a fairly even distribution of cache documents throughout the cache.

The invention uses a technique, such as the MD5® (Message Digest-5) protocol, to compress a variable length URL and thereby homogenize the URL, such that each URL, in practice, has a unique identity and a fixed size. Because all the data produced using the MD5® (Message Digest-5) protocol to compress and homogenize the URL are not needed, it is possible to support more documents than necessary with less than the sum total of data generated by the MD5® (Message Digest-5) protocol. With a subset of the total available data, it is possible to take a first portion of the data, e.g. six bytes and, for each byte, take the first N bits of each of the first M bytes to map the URL to the proxy server cache structure, as discussed above. After the system proceeds through this hierarchy and maps the URL to the directory, the system also provides a unique file name for each document pointed to by a URL.

The MD5® (Message Digest-5) protocol fingerprint is used to develop a unique document name at the bottom of the cache hierarchy. When the path identified by the first N bits in the first bytes is followed, there is a unique file name for the URL that is derived from the selected subset of the MD5® (Message Digest-5) protocol fingerprint. To produce the desired eight character file name, the system takes the six valid bytes, including the already once used bits to yield the directory path. The reason for reusing these bits is that any given document can be remapped later to a structure that had been expanded or collapsed, so that the first bits are not unique to a particular hierarchy.

A special file in each cache directory, the cache info file (CIF), provides a central repository for information for all the documents in that specific directory. In the CIF, there are single lines that start with the file name, so that the system can match which entry belongs to which file. There are several parameters associated with the CIF that describe, for example when a related document was loaded to the cache, when it was last accessed, and when it was last refreshed or checked that it was still up to date.

Accordingly, the invention provides a way of organizing the cache with small entries containing enough information about each cache file so that the actual cache document needs not be opened during cache cleanup (i.e. garbage collection).

DETAILED DESCRIPTION OF THE INVENTION

The invention provides a mechanism that reduces the number of files or directories in any given directory in the cache directory structure and that also reduces the depth of the directory structure. The invention includes a cache architecture that provides a preallocated structure of directories which, in one embodiment of the invention (FIG. 3a) comprises 16 directories, where each such directory is three levels deep (thus, on the third level there are 4,096 directories total); and which, in a second embodiment of the invention (FIG. 3b) comprises any number of cache partitions that may include any desired number of cache sections, where each cache section has 64 subdirectories. The invention is of particular use for caching documents pointed to by URLs, such that it is not necessary to keep going out and finding and re-retrieving the documents, e.g. frequently used documents are stored locally.

Figure 1:
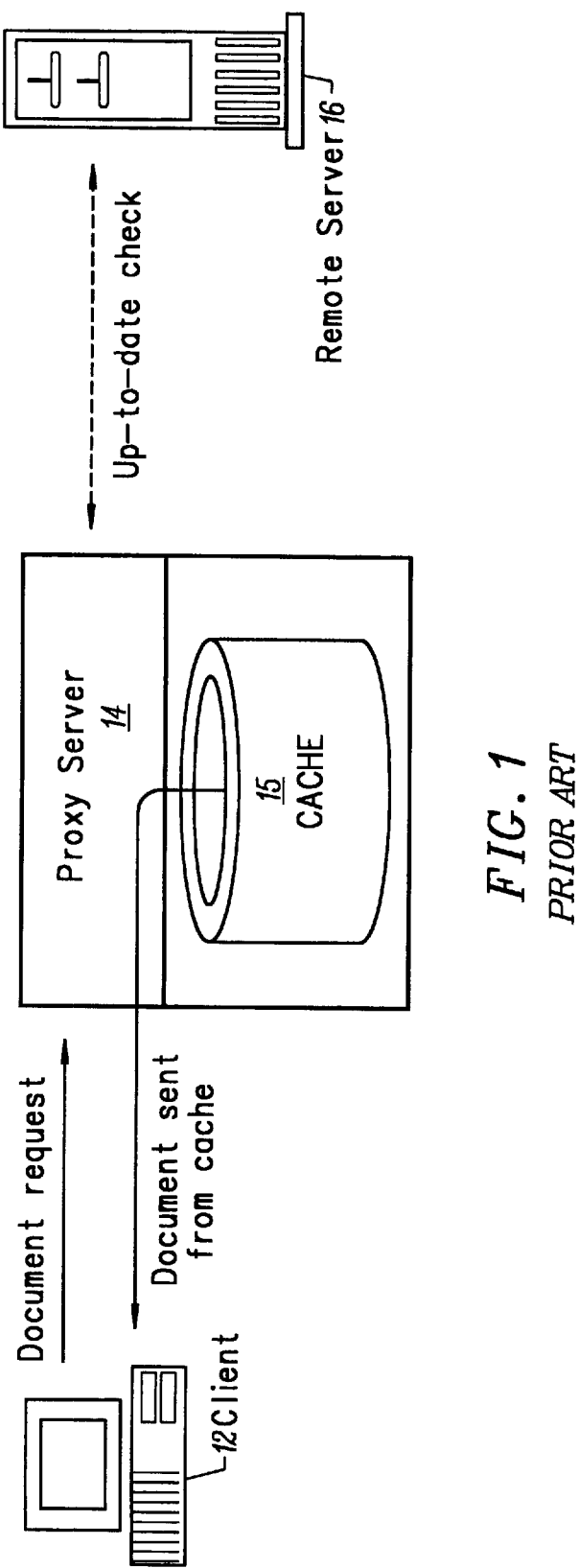
FIG. 1 is a block schematic diagram of a proxy server.
Figure 2:
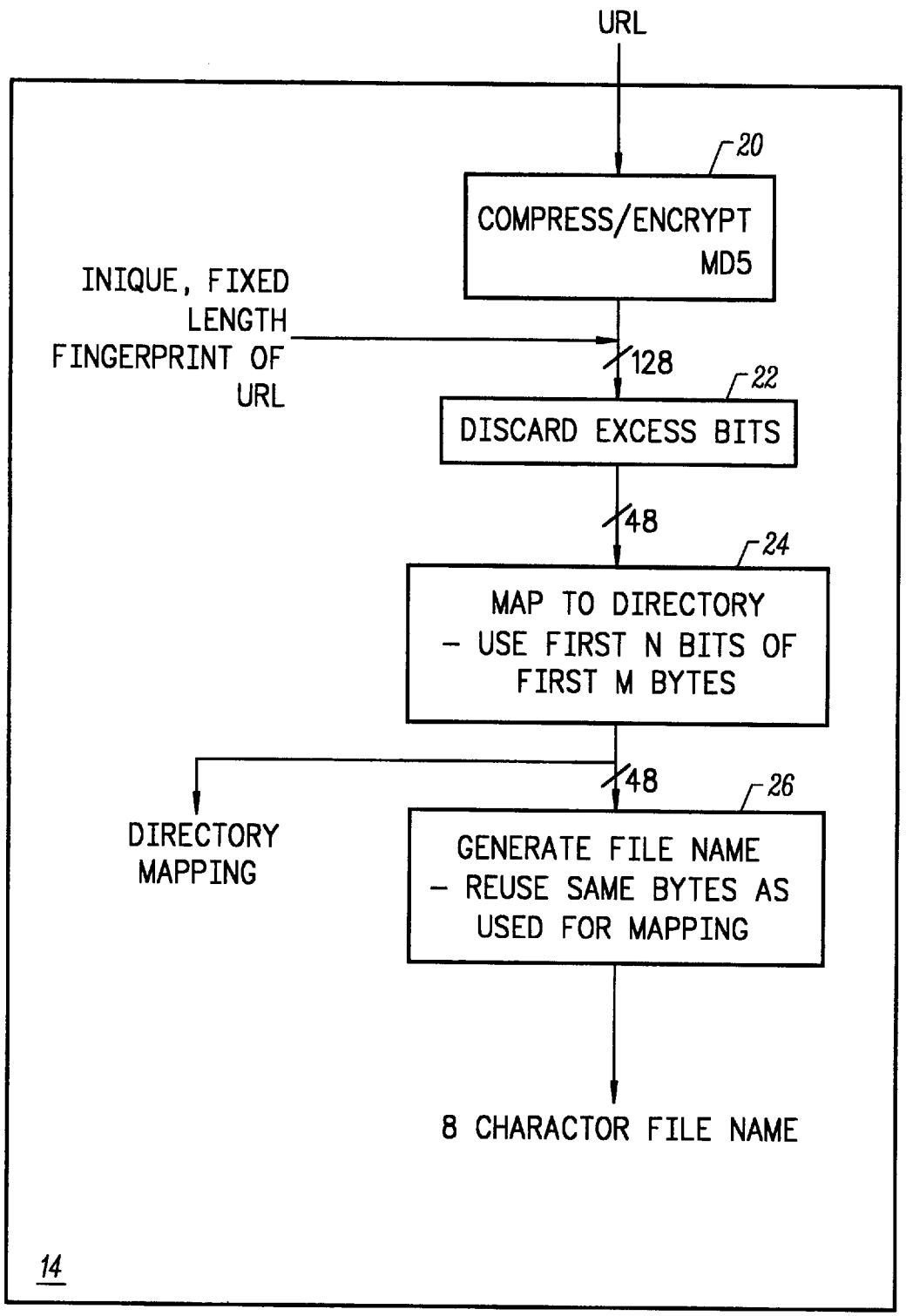
FIG. 2 is a block schematic diagram showing generation of a directory mapping and a file name from a URL according to a preferred embodiment of the invention.

FIG. 2 is a block schematic diagram showing generation of a directory mapping and a file name from a URL according to the invention. In operation, the invention provides a protocol 20 that digests the URL in such way that a fixed length, unique (with high probability thereof) fingerprint is produced for each URL. The preferred embodiment of the invention takes an MD5® (Message Digest-5) protocol (RSA Data Security, Inc.) signature of the URL in the proxy server 14.

A message digest (signature) may be thought of as a fingerprint of data in which an input piece of data, such as a URL, produces an output that, in the case of the MD5® (Message Digest-5) protocol is 128 bits of data, and that has a high probability of unique correlation with regard to the input data. For example, if a book is processed through the MD5® (Message Digest-5) protocol, it always produces the same signature. If even one character is changed in the book, the signature changes. Thus, the MD5® (Message Digest-5) protocol is useful for indicating if anyone has tampered with the data, or if the data have been corrupted. If there are more samples than can be described with the amount of bits provided in the signature, there is a possibility that a collision can occur in which two different sets of data produce the same fingerprint, but in practice such occurrence is extremely unlikely. For purposes of practicing the invention, it is not essential that the MD5® (Message Digest-5) protocol be used. Other message digest techniques can be used that produce a unique, fixed length word from a variable length string of input data.

In the preferred embodiment of the invention, the proxy server provides a module 22 that ignores ten bytes of the signature produced by the MD5® (Message Digest-5) protocol, i.e. it only use six bytes or 48 bits. These values are parameters that are provided for purposes of the discussion herein and can be selected as desired for the application to which to invention is put. The 48 bits provided are sufficient to map about 70 million URLs (i.e. 70 million documents) with a very high probability they are unique, such that the proxy sever is not likely to produce collisions. These 70 million URLs, given a typical document size of 12,000 bytes, comprise almost 1 terabyte of data. For comparison, in today's typical setup the cache size is only 2–10 Gb. Should more storage be required, additional bits from the MD5® (Message Digest-5) protocol conversion may be retained, rather than discarded.

From a URL, the technique herein produces six bytes of data. This provides a good key for addressing the URL or the document in question. The invention provides a module 24 that preferably first operates on the six bytes of data to map the URL to a directory structure.

Figure 3A:
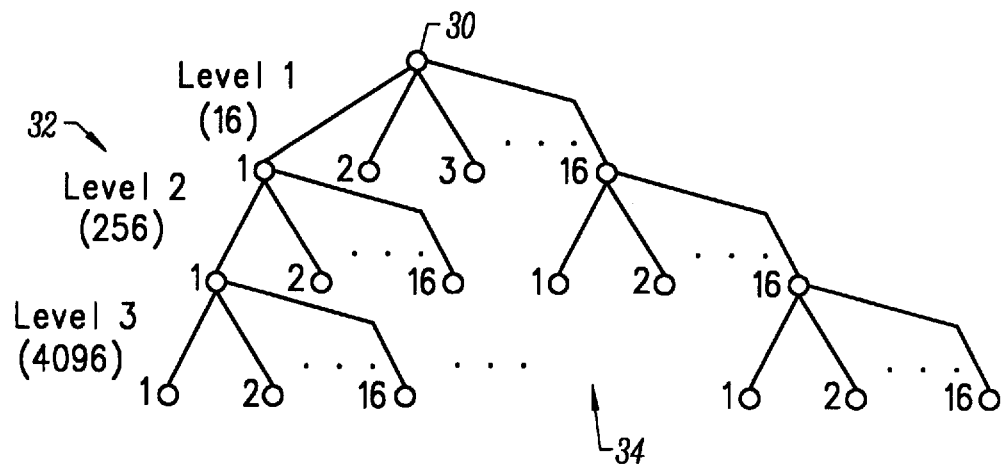
FIG. 3a is a schematic representation of a file directory structure according to a first embodiment of the invention.

FIG. 3a is a schematic representation of a file directory structure according to a first embodiment of the invention. The top level directory 30 can have, for example one, two, four, eight, or 16 directories which map to a different cache capacity. The first preferred embodiment of the invention uses the full four bits of the first byte of the six bytes to map the URL signature to the first level of the directory. The directory shown in FIG. 3a provides a second level directory 32, consisting of 16 directories for each of the 16 directories at the first level directory (i.e. 256 directories), and a third level directory 34, consisting of 16 documents for each of the 256 second level directories.

Figure 3B:
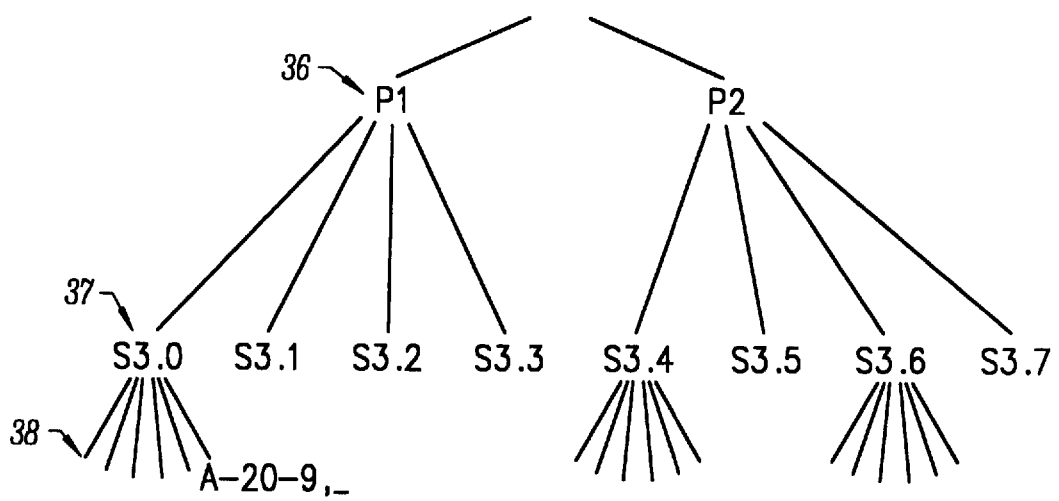
FIG. 3b is a schematic representation of a file directory structure according to a second embodiment of the invention.

FIG. 3b is a schematic representation of a file directory structure according to a second embodiment of the invention. This embodiment of the invention is presently preferred and uses another, more efficient set of parameters. The actual dimensions of the cache structure are tunable. The cache structure has 1, 2, 4, 8, 16, 32, 64, 128, or 256 top-level directories 37 ("cache sections") which, in this example are contained in cache partitions P1, P2, P3, . . . , Pn 36. It should be appreciated that there may be any number of cache partitions.

The directories are configurable, corresponding to different cache capacities from 125 Mb to 32 Gb, but the optimum figures depend upon the operating system used. There are 64 subdirectories 38 in each of the above mentioned directories. Thus, only two levels exist in this directory structure, while three levels of 16 directories each are provided by the cache directory structure shown in FIG. 3a. The structure of FIG. 3b yields the same number of deepest level directories (i.e. 4096) as the structure of FIG. 3a if there are 64 top level directories. The optimum dimensions of the cache depend upon the operating system used, desired cache capacity, and available disk space.

The invention also provides a module 26 (FIG. 2) that preferably next generates a file name for the URL from the six bytes of data. Because the invention only uses six bytes of the MD5® (Message Digest-5) protocol URL signature, which is 48 bits, eight of any of 64 characters (e.g. a–z, A–Z, 0–9, _, and ,) may be described because it takes six bits to represent 64 characters. In practice, an ASCII character is eight bits. These six bytes of MD5® (Message Digest-5) protocol data are therefore expanded to the eight bytes, i.e. eight characters, in a file name. This is accomplished by taking the first six bits of the 48 bits that comprise the six bytes of data and mapping them to one of the characters in the document name, and then taking the subsequent sets of six next bits again and again. This process results in eight of these six bit chunks because 8×6 is 48.

The invention makes it possible to locate any cache document anywhere by providing the input URL is used to produce both a document name and a directory to which the document belongs. A fixed size directory structure is thus provided in which a digest scheme, such as the MD5® (Message Digest-5) protocol, is used both to map the URL into the directory, and to generate the file name. In some embodiments of the invention, eliminating the third directory level to provide only two directory levels having bigger directories is a more efficient load. Proportionally going one more directory level deep degrades system performance more than having to search through a slightly bigger directory. The actual directory structure is determined as a matter of choice based upon such factors as the target architecture and operating system.

The invention uses a technique, such as the MD5® (Message Digest-5) protocol, to digest a variable length URL and thereby homogenize the URL, such that each URL has a unique identity and a fixed size. Because all the data produced using MD5® (Message Digest-5) protocol to digest and homogenize the URL are not needed, it is possible to support more documents than needed with less than the sum total of data generated by the MD5® (Message Digest-5) protocol. With a subset of the data, it is possible to take the first portion of the data, e.g. six bytes and, for each byte, take the first N bits of the first M bytes to map the URL to the proxy server cache structure, as discussed above. After the system proceeds through this hierarchy and maps the URL to the directory, the system also provides a unique file name for each URL. Thus, a subset of the MD5® (Message Digest-5) protocol fingerprint is used to develop a unique file name at the end of a cache hierarchy. When the path identified by the first N bits is followed, there is a unique file name for the URL that is derived from the subset of the MD5® (Message Digest-5) protocol fingerprint. To produce the desired eight character document name, the system takes the six valid bytes and uses the same bits again in the document name. The reason for reusing these bits is that any given document can be remapped later to a structure that had been expanded or collapsed, so that the first bits are not unique to a particular hierarchy.

A file in the directory, the cache information file (CIF), provides a central repository for information for all the documents in the directory and contains information about all the other documents in the directory. The CIF is much smaller than a global cache information file would be. In the exemplary CIF, there are single lines that start with the file name, so that the system can match which entry belongs to which cache file. There are several parameters associated with the CIF for each file that describe, for example when a related document was loaded to the cache, when it was last accessed, and when it was last refreshed or checked that it was still up to date.

Figure 4:
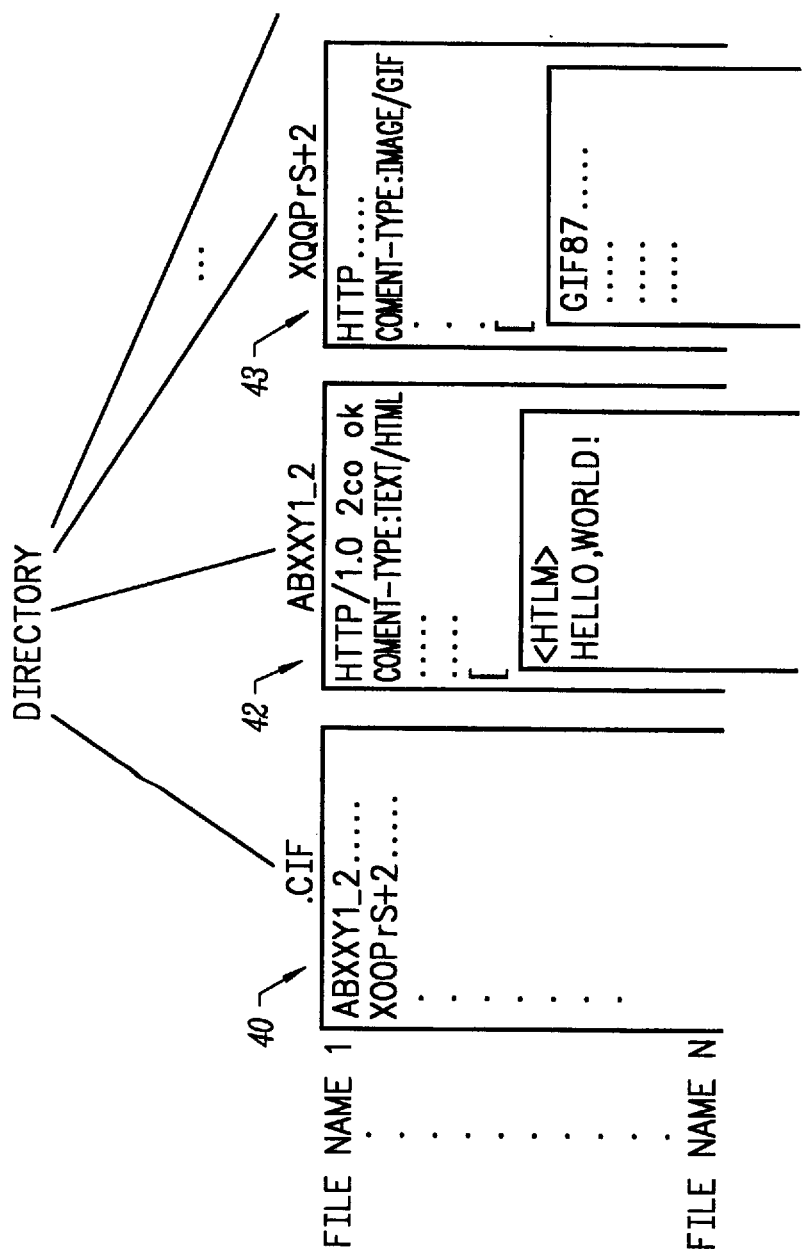
FIG. 4 is a schematic representation of a file directory showing a CIF file structure according to the invention.

FIG. 4 is a schematic representation of a file directory showing a CIF file structure according to the invention. A cache document includes both a header and the document content. One use of the proxy server is to make such header information more easily accessible. It is not desirable to mark the headers themselves. Therefore, the invention provides the CIF file, for example to store such information as the document expiration date, the last modified date, document length, and content type in the cache document. Such information is stored in the CIF file to make the information faster and more convenient for the proxy server and the garbage collector to locate and use.

The CIF file 40 comprises a list of document names, e.g. file name 1 through file name N, as well as each related cache document, e.g. documents ABXXYI_2 42 and XQQPrSt2 43. When the proxy server is accessed, the invention provides a mechanism for checking to determine if the desired URL is cached. Thus, an MD5® (Message Digest-5) protocol fingerprint is generated from the URL, the directory path and document name are generated, and a check is made to see if the desired file exists. If it does, then the CIF entry for the URL fingerprint is looked up in the CIF file. For the sake of hash collision detection, i.e. where the same fingerprint is produced for two different URLs, the CIF also includes the URL, which is then checked before the cache file is actually used.

When the CIF file is opened by the proxy server, various document related parameters may be accessed. Such parameters may include, for example when the document was last refreshed, which determines when the document should be checked again. Sometimes it is not necessary to check the document again. Rather it is only necessary to determine if the document has been checked recently enough that it still has a high probability of being up to date. Thus, the document can be returned without any external connection, which makes accessing the document much faster.

Other CIF file related parameters include the document expiration time and the last modification time. Expiration time requires that it is mandatory to force a check that the document is still up to date if it is marked expired by the original server. The last modified date is used to make those up-to-date checks.

Parameters may also include when the server originally sent the document and the last modified date. When it is desired to perform up-to-date checks, the proxy server connects to the remote server and requests that the document in question be sent, but only if the document has been modified since the most recently logged modification date/time. There may also be some information related the CIF file that are not stored in the CIF file because the operating system, e.g. the UNIX file system, already maintains them, for example the last access and last modification time of the file.

Other parameters that may be included in a file's CIF file entry include a requirement that authentication is needed and the length of the document.

As shown on FIG. 4, a single line of text is provided in the CIF file for every cache document. In the example shown on FIG. 4, every cache document other than the CIF file starts with a status line, e.g. "HTTP/1.0 200 OK." The document then indicates document content type, e.g. a text/html document. There may also be other headers, and then there is an empty line, after which the actual document is provided, e.g. an HTML document. The format is thus the same as the format used by the HTTP protocol. In the example of FIG. 4, the document content is "Hello, World!" FIG. 4 also shows another cache document that has the HTTP header section, the header lines, an empty line, and then the actual document content, which is in this case a GIF document.

Thus, the invention produces the MD5® (Message Digest-5) protocol signature, derives the file name, and looks up the file. If the document is not in the cache, then the invention creates a cache entry that comprises the document and also adds the document information to the CIF file as a CIF entry. If the document is already in cache, then the cached document may be used and it is not necessary to obtain the document over the network. However, before the cache file may be used, it is nonetheless necessary to determine the status of the document by accessing the CIF file entry for the document, and possibly make an up-to-date check to the remote origin server.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

I claim:

1. A cache mechanism for a proxy server, comprising:

an input for receiving a variable length string of data that defines a file protocol and path;

a message digest module for converting said variable length string of data to a unique, fixed length file protocol and path fingerprint; and a mapping facility for mapping said fingerprint to a file directory;

wherein said input variable length string of data is used to identify both a file name and a directory to which said file belongs.

2. The mechanism of claim 1, wherein said variable length string of data is digested by said converting module.

3. The mechanism of claim 2, wherein an MD5 protocol is used to digest said variable length string of data.

4. The mechanism of claim 3, wherein a subset of a data string produced by said MD5 protocol is used as said fingerprint.

5. The mechanism of claim 1, wherein said mapping facility takes a first N bits of a first M bytes of said fingerprint to map said fingerprint to said file directory.

6. The mechanism of claim 1, wherein said fingerprint defines both a file directory mapping and a file name to allow said input variable length string of data to be remapped to a directory structure that had been expanded or collapsed, such that said file name is not unique to a particular directory hierarchy.

7. The mechanism of claim 1, wherein said directory comprises a plurality of directories having a plurality of levels.

8. The mechanism of claim 1, further comprising:

a cache info file (CIF) that provides a central repository of information about each file in said directory.

9. The mechanism of claim 8, wherein said CIF defines parameters associated with each file in said directory.

10. The mechanism of claim 8, wherein said CIF is accessed before a file identified by said fingerprint may be used.

11. The mechanism of claim 1, wherein said input variable length string of data is a uniform resource locator (URL).

12. A cache mechanism for a proxy server, comprising:

an input for receiving a variable length string of data that defines a file protocol and path;

a message digest module for converting said variable length string of data to a unique, fixed length file protocol and path fingerprint; and a mapping facility for mapping said fingerprint to a file directory and for providing a normal distribution of data throughout said;

wherein said input variable length string of data is used to produce both a file name and a directory to which said file belongs.

13. The mechanism of claim 12, wherein said variable length string of data is digested by said converting module.

14. The mechanism of claim 13, wherein an MD5 protocol is used to digest said variable length string of data.

15. The mechanism of claim 14, wherein a subset of a data string produced by said MD5 protocol is used as said fingerprint.

16. The mechanism of claim 12, wherein said mapping facility takes a first N bits of a first M bytes of said fingerprint to map said fingerprint to said file directory.

17. The mechanism of claim 12, wherein said fingerprint defines both a file directory mapping and a file name to allow said input variable length string of data to be remapped to a directory structure that had been expanded or collapsed, such that said file name is not unique to a particular directory hierarchy.

18. The mechanism of claim 12, wherein said directory comprises a plurality of directories having a plurality of levels.

19. The mechanism of claim 12, further comprising:

a cache info file (CIF) that provides a central repository of information about each file in said directory.

20. The mechanism of claim 19, wherein said CIF defines parameters associated with each file in said directory.

21. The mechanism of claim 19, wherein said CIF is accessed before a file identified by said fingerprint may be used.

22. The mechanism of claim 12, wherein said input variable length string of data is a uniform resource locator (URL).

23. A method for accessing files in proxy server cache, comprising the steps of:

receiving a variable length string of data that defines a file protocol and path;

converting said variable length string of data to a unique, fixed length file protocol and path fingerprint with a message digest module; and mapping said fingerprint to a file directory;

wherein said input variable length string of data is used to identify both a file name and a directory to which said file belongs.

24. A method for accessing files in proxy server cache, comprising the steps of:

receiving a variable length string of data that defines a file protocol and path;

converting said variable length string of data to a unique, fixed length file protocol and path fingerprint with a message digest module; and generating a file name from said fingerprint and providing a normal distribution of data throughout said cache;

wherein said input variable length string of data is used to generate both a file name and a directory to which said file belongs.

* * * * *